United States Patent
Zhuo

(10) Patent No.: US 10,200,342 B2
(45) Date of Patent: Feb. 5, 2019

(54) DYNAMIC CONFIGURATIONS BASED ON THE DYNAMIC HOST CONFIGURATION PROTOCOL

(71) Applicant: Nicira, Inc., Palo Alto, CA (US)

(72) Inventor: Zhenjun Zhuo, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 334 days.

(21) Appl. No.: 14/815,862

(22) Filed: Jul. 31, 2015

(65) Prior Publication Data

US 2017/0033988 A1   Feb. 2, 2017

(51) Int. Cl.
*H04L 29/12* (2006.01)

(52) U.S. Cl.
CPC .................. *H04L 61/2015* (2013.01)

(58) Field of Classification Search
CPC .................................................. H04L 61/2015
See application file for complete search history.

(56) References Cited

U.S. PATENT DOCUMENTS

| | | | | |
|---|---|---|---|---|
| 6,073,178 A * | 6/2000 | Wong | ................ | H04L 29/12216 370/474 |
| 6,603,758 B1 * | 8/2003 | Schmuelling | ....... | H04L 12/2872 370/351 |
| 6,618,757 B1 * | 9/2003 | Babbitt | ............. | H04L 29/12283 370/431 |
| 6,823,454 B1 * | 11/2004 | Hind | ................. | H04L 29/12066 713/168 |
| 6,876,667 B1 * | 4/2005 | Synnestvedt | ....... | H04L 12/2801 370/352 |
| 6,912,567 B1 * | 6/2005 | Allard | ................. | H04L 12/2856 370/260 |
| 7,096,273 B1 * | 8/2006 | Meier | ............... | H04L 29/12235 709/222 |
| 7,139,818 B1 * | 11/2006 | Kinnear, Jr. | ...... | H04L 29/12273 709/222 |
| 7,171,492 B1 * | 1/2007 | Borella | ................... | H04L 69/16 709/245 |
| 7,185,079 B1 * | 2/2007 | Bainbridge | ....... | H04L 29/12283 709/223 |
| 8,416,691 B1 * | 4/2013 | Haberman | .......... | H04L 12/2876 370/235 |
| 8,953,609 B1 * | 2/2015 | Zhao | ................... | H04L 61/2015 370/392 |

(Continued)

OTHER PUBLICATIONS

Braden, "Requirements for Internet Hosts—Application and Support", RFC1123, 1989.*

(Continued)

*Primary Examiner* — Ondrej C Vostal
(74) *Attorney, Agent, or Firm* — Adeli LLP

(57) ABSTRACT

Some embodiments provide a method for dynamically configuring multiple instances of applications that operate on clients in a network system. The method of some embodiments uses the Dynamic Host Configuration Protocol (DHCP) to configure the multiple instances of each application to share a pool of resources specific to the application that are used for configuring the application on each of the clients. Some embodiments of the invention store an application ID in DHCP-formatted packets to differentiate the packets from DHCP packets and to distribute shared configuration resources between various instances of the application.

22 Claims, 7 Drawing Sheets

(56) References Cited

U.S. PATENT DOCUMENTS

| | | | |
|---|---|---|---|
| 8,990,824 B2* | 3/2015 | Nilakantan | G06F 9/45558 709/220 |
| 9,210,124 B2* | 12/2015 | Gao | H04L 61/2532 |
| 2002/0046263 A1* | 4/2002 | Camerini | G05B 19/042 709/219 |
| 2002/0165972 A1* | 11/2002 | Chien | H04L 12/2856 709/229 |
| 2003/0233452 A1* | 12/2003 | Maufer | H04L 29/12018 709/225 |
| 2004/0004968 A1* | 1/2004 | Nassar | H04L 29/12481 370/401 |
| 2004/0064559 A1* | 4/2004 | Kupst | H04L 29/12216 709/226 |
| 2004/0095932 A1* | 5/2004 | Astarabadi | H04L 29/1216 370/389 |
| 2004/0114590 A1* | 6/2004 | Harris | H04L 29/06 370/389 |
| 2004/0143654 A1* | 7/2004 | Poirot | H04L 41/082 709/223 |
| 2004/0172473 A1* | 9/2004 | Lukas | H04L 29/06 709/226 |
| 2004/0208151 A1* | 10/2004 | Haverinen | H04L 29/12 370/338 |
| 2004/0228363 A1* | 11/2004 | Adamczyk | H04J 3/16 370/468 |
| 2005/0013280 A1* | 1/2005 | Buddhikot | H04L 29/12358 370/349 |
| 2005/0038889 A1* | 2/2005 | Frietsch | H04L 12/56 709/224 |
| 2005/0055578 A1* | 3/2005 | Wright | G06F 21/32 726/4 |
| 2005/0105529 A1* | 5/2005 | Arberg | H04L 29/12273 370/395.5 |
| 2005/0144032 A1* | 6/2005 | Shimoda | G06Q 30/0601 705/26.1 |
| 2005/0198310 A1* | 9/2005 | Kim | H04L 61/2076 709/227 |
| 2006/0047829 A1* | 3/2006 | Acharya | H04L 67/14 709/229 |
| 2006/0075123 A1* | 4/2006 | Burr | H04L 29/12311 709/228 |
| 2006/0294257 A1* | 12/2006 | Kumano | H04L 29/12018 709/245 |
| 2007/0022211 A1* | 1/2007 | Shimizu | H04L 29/12028 709/238 |
| 2007/0104145 A1* | 5/2007 | Jan | H04L 29/12216 370/331 |
| 2007/0245033 A1* | 10/2007 | Gavrilescu | H04L 29/12801 709/230 |
| 2008/0071890 A1* | 3/2008 | Meier | H04L 29/12933 709/220 |
| 2008/0247399 A1* | 10/2008 | Hazard | H04L 45/02 370/395.31 |
| 2008/0275995 A1* | 11/2008 | Soliman | H04L 41/12 709/230 |
| 2008/0285520 A1* | 11/2008 | Forte | H04W 36/0011 370/331 |
| 2009/0086688 A1* | 4/2009 | Kvache | H04L 12/2809 370/338 |
| 2009/0198800 A1* | 8/2009 | Dighe | H04L 29/12028 709/221 |
| 2010/0039958 A1* | 2/2010 | Ge | H04L 12/2803 370/254 |
| 2010/0107155 A1* | 4/2010 | Banerjee | G06F 8/60 717/177 |
| 2010/0115587 A1* | 5/2010 | Kubota | G06F 21/34 726/3 |
| 2010/0122338 A1* | 5/2010 | Kataoka | H04L 61/2015 726/12 |
| 2010/0180014 A1* | 7/2010 | Kannan | H04L 29/12216 709/220 |
| 2011/0010413 A1* | 1/2011 | Christenson | H04L 29/12066 709/203 |
| 2011/0010463 A1* | 1/2011 | Christenson | H04L 29/12066 709/245 |
| 2011/0072120 A1* | 3/2011 | Guo | H04L 61/2015 709/222 |
| 2011/0141924 A1* | 6/2011 | Froehlich | H04L 41/0893 370/252 |
| 2013/0024553 A1* | 1/2013 | Mittal | H04L 41/0893 709/222 |
| 2013/0212680 A1* | 8/2013 | Winn | H04L 51/12 726/23 |
| 2013/0305320 A1* | 11/2013 | Warrick | H04L 61/103 726/4 |
| 2014/0006640 A1* | 1/2014 | Subramanian | H04L 41/00 709/245 |
| 2014/0016612 A1* | 1/2014 | Montemurro | H04W 8/087 370/331 |
| 2014/0047081 A1* | 2/2014 | Edwards | G06Q 10/10 709/220 |
| 2014/0068720 A1* | 3/2014 | Somers | H04L 63/1441 726/4 |
| 2014/0115706 A1* | 4/2014 | Silva | G06F 9/45533 726/23 |
| 2014/0222982 A1* | 8/2014 | Shigeeda | H04L 61/2007 709/222 |
| 2014/0223013 A1* | 8/2014 | Gaglianello | H04L 61/2084 709/226 |
| 2014/0244733 A1* | 8/2014 | Han | H04L 61/103 709/203 |
| 2014/0344477 A1* | 11/2014 | Shigeeda | H04L 61/2038 709/245 |
| 2014/0362870 A1* | 12/2014 | Huang | H04L 61/2061 370/437 |
| 2015/0235308 A1* | 8/2015 | Mick | G06Q 30/08 705/26.3 |
| 2015/0312208 A1* | 10/2015 | Chatterjee | H04L 61/2015 709/245 |
| 2015/0317169 A1* | 11/2015 | Sinha | H04L 49/254 713/2 |
| 2015/0319091 A1* | 11/2015 | Arora | H04L 12/403 370/235 |
| 2015/0334696 A1* | 11/2015 | Gu | H04L 67/1095 718/1 |
| 2016/0057028 A1* | 2/2016 | Smith | H04L 43/08 370/252 |
| 2016/0080315 A1* | 3/2016 | Anggawijaya | H04L 61/2015 709/228 |
| 2016/0092697 A1* | 3/2016 | Nayshtut | H04W 12/00 726/26 |
| 2016/0099912 A1* | 4/2016 | Wells | H04L 61/2015 709/226 |
| 2016/0127509 A1* | 5/2016 | Uriel | H04L 61/103 709/203 |
| 2016/0156702 A1* | 6/2016 | Morper | H04L 67/10 709/223 |
| 2016/0156718 A1* | 6/2016 | Allan | H04L 67/10 709/228 |
| 2016/0164829 A1* | 6/2016 | Shigeeda | H04L 61/103 709/245 |
| 2016/0248729 A1* | 8/2016 | Cui | H04L 61/2015 |
| 2016/0255045 A1* | 9/2016 | Kolesnik | H04L 61/2015 709/222 |
| 2017/0195162 A1* | 7/2017 | Enrique Salpico | H04L 29/08009 |

OTHER PUBLICATIONS

Braden, "Requirements for Internet Hosts—Communication Layers", RFC1122, 1989.*

Droms, "Dynamic Host Configuration Protocol", RFC2131, 1997.*

Wimer, "Clarifications and Extensions for the Bootstrap Protocol", RFC1542, 1993.*

Patrick, "DHCP Relay Agent Information Option", RFC 3046, 2001.*

(56) References Cited

OTHER PUBLICATIONS

Srisuresh et al., "IP Network Address Translator (NAT) Terminology and Considerations", RFC 2663, 1999.*
Almesberger et al., "Application REQuested IP over ATM (AREQUIPA)", 1997 (Year: 1997).*
Gao et al., "An Access Control Architecture for Programmable Routers", 2001 (Year: 2001).*

* cited by examiner

DYNAMIC CONFIGURATIONS BASED ON THE DYNAMIC HOST CONFIGURATION PROTOCOL

BACKGROUND

Large and diverse network environments, such as datacenters, are becoming increasingly automated and dynamic, with various clients and applications that operate on the clients constantly being added and removed. As the size of the network environments grows, the overhead of maintenance and configuration for the clients and applications grows as well. It becomes increasingly difficult to provide dynamic configurations for the clients and applications, especially when the configurations for different clients running instances of the same application cannot be statically configured, but rather need to be dynamically configured to share a set of available resources between all of the various instances of the application.

BRIEF SUMMARY

Some embodiments of the invention provide a method for dynamically configuring multiple instances of applications that operate on clients in a network system. The method of some embodiments configures the multiple instances of each application to share a pool of resources specific to the application that are used for configuring the application on each of the clients.

In some embodiments, the method uses a unique application ID that is assigned to each application in the network system to distribute configuration resources from a set of configuration servers to each instance of an application operating on the clients. Some embodiments provide an application agent that operates on each client, which communicates with a set of application configuration services operating on the configuration servers of the network system. In some embodiments, the configuration resources for several different applications are distributed across the configuration servers, with each configuration server maintaining pools of the configuration resources for one or more of the applications.

When an instance of an application needs to be configured on a client, the application agent of some embodiments makes a request of the application configuration services of the configuration servers using the application ID for the application. In some embodiments, the application agent communicates with the configuration servers using the Dynamic Host Configuration Protocol (DHCP). In some such embodiments, the application agent and the application configuration service use the application ID (e.g., stored in a field of the packets that is unused by DHCP) to differentiate the application configuration packets from DHCP packets.

The application agent broadcasts a discovery packet with the application ID to a set of configuration servers that provide the application configuration services. Each of the application configuration services of some embodiments reserves a resource (e.g., an Internet Protocol (IP) address, a Media Access Control (MAC) address, etc.) from a pool of shared resources and responds with a set of response packets with configuration information for the application agent. The application agent then receives response packets from the configuration servers and configures the application to operate on the client based on a selected response packet of the received response packets.

The network system of some embodiments includes configuration servers that provide traditional DHCP services as well as the application configuration services. The configuration servers of some embodiments include dedicated DHCP servers and/or dedicated application configuration servers, which only provide one of the services, while other embodiments include hybrid configuration servers that provide both services simultaneously for clients in the network.

In some embodiments, the hybrid configuration servers include a packet receiver that analyzes incoming DHCP-formatted packets to determine whether the packet includes an application ID, and forwards the packet to either the DHCP service or the application configuration service accordingly. In some embodiments, different configuration servers will maintain resource pools for different applications. For example, a first application configuration server may maintain resource pools for applications A, B, and C, while a second application configuration server maintains resource pools for applications C, D, and E. The packet receiver of some embodiments will further determine whether the particular configuration server maintains a resource pool for an incoming packet based on the application ID of the incoming packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
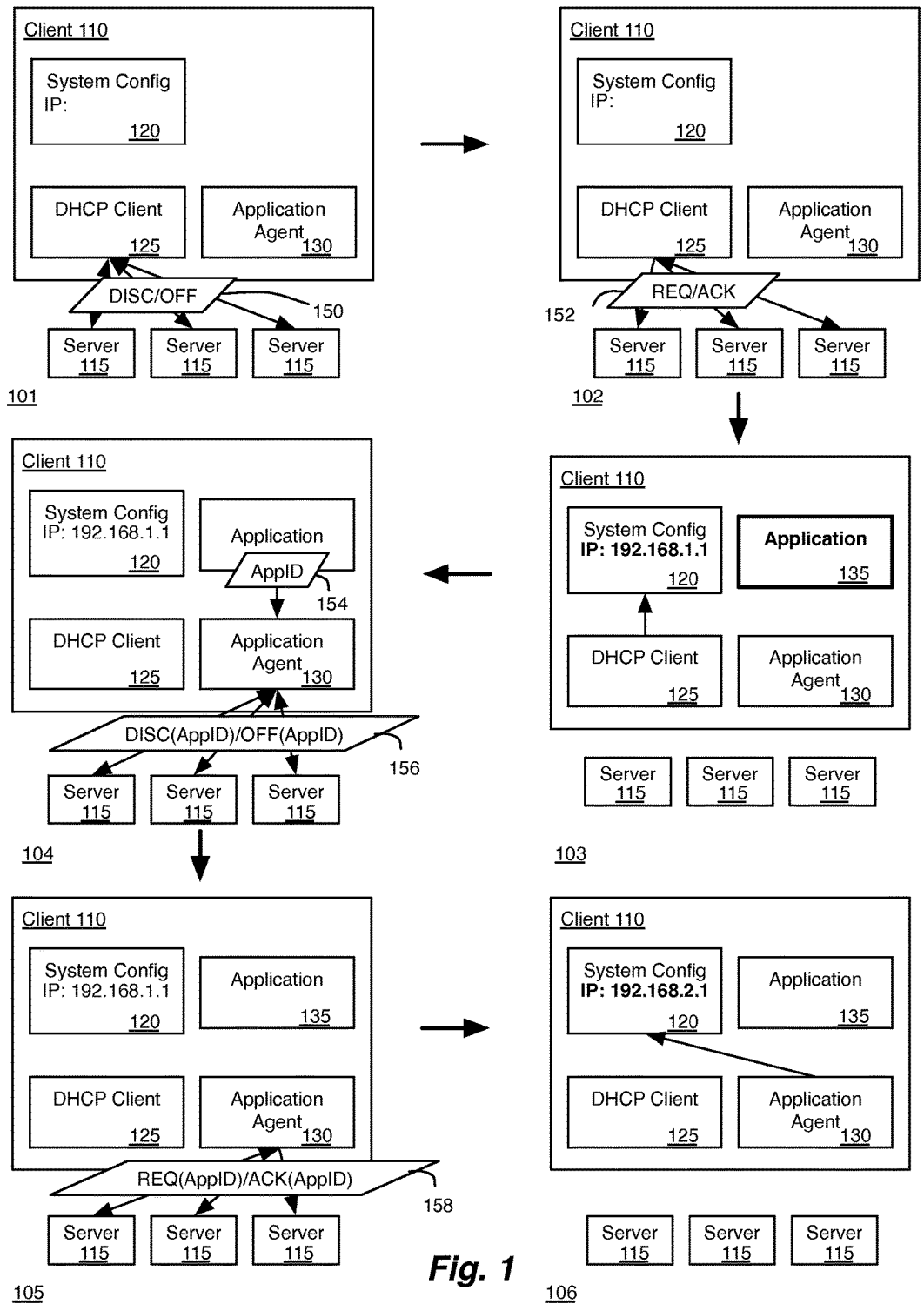
FIG. 1 illustrates an example of a client as it instantiates and configures an instance of an application in a network.

Some embodiments of the invention provide a method for dynamically configuring multiple instances of applications that operate on clients in a network system. The method of some embodiments configures the multiple instances of each application to share a pool of resources specific to the application that are used for configuring the application on each of the clients.

In some embodiments, the method uses a unique application ID that is assigned to each application in the network system to distribute configuration resources from a set of configuration servers to each instance of an application operating on the clients. Some embodiments provide an application agent that operates on each client, which communicates with a set of application configuration services operating on the configuration servers of the network system. In some embodiments, the configuration resources for several different applications are distributed across the configuration servers, with each configuration server maintaining pools of the configuration resources for one or more of the applications.

When an instance of an application needs to be configured on a client, the application agent of some embodiments makes a request of the application configuration services of the configuration servers using the application ID for the application. In some embodiments, the application agent communicates with the configuration servers using the Dynamic Host Configuration Protocol (DHCP). In some such embodiments, the application agent and the application configuration service use the application ID (e.g., stored in a field of the packets that is unused by DHCP) to differentiate the application configuration packets from DHCP packets.

The application agent broadcasts a discovery packet with the application ID to a set of configuration servers that provide the application configuration services. Each of the application configuration services of some embodiments reserves a resource (e.g., an Internet Protocol (IP) address, a Media Access Control (MAC) address, etc.) from a pool of shared resources and responds with a set of response packets with configuration information for the application agent. The application agent then receives response packets from the configuration servers and configures the application to operate on the client based on a selected response packet of the received response packets.

The network system of some embodiments includes configuration servers that provide traditional DHCP services as well as the application configuration services. The configuration servers of some embodiments include dedicated DHCP servers and/or dedicated application configuration servers, which only provide one of the services, while other embodiments include hybrid configuration servers that provide both services simultaneously for clients in the network.

In some embodiments, the hybrid configuration servers include a packet receiver that analyzes incoming DHCP-formatted packets to determine whether the packet includes an application ID, and forwards the packet to either the DHCP service or the application service accordingly. In some embodiments, different configuration servers will maintain resource pools for different applications. For example, a first application configuration server may maintain resource pools for applications A, B, and C, while a second application configuration server maintains resource pools for applications C, D, and E. The packet receiver of some embodiments will further determine whether the particular configuration server maintains a resource pool for an incoming packet based on the application ID of the incoming packet.

The above description introduces a system for configuring applications in a network environment. Several more detailed embodiments are described below. Section I describes examples of an application agent that operates on the clients to request configuration resources from the configuration servers. Section II describes examples of an application configuration service that operates on servers in the network to distribute the configuration resources. Section III describes examples configuring a client and an instance of an application in a mixed network environment. Finally, Section IV describes an electronic system with which some embodiments of the invention are implemented.

I. Application Agent

Some embodiments provide an application agent to configure instances of applications that operate on clients in a network. The application agent of some embodiments is installed and instantiated on each client during the initial configuration of the client and is able to configure any of a group of applications that may be instantiated on the client. Alternatively, or conjunctively, the application agent of some embodiments is configured specifically for a particular application that is instantiated on the client.

In some embodiments, prior to instantiating an instance of the application, the client configures its own settings as well. For example, the initial configuration may occur when the client initializes (e.g., upon bootup, when the client is a virtual machine that is instantiated on a host machine, etc.), when a DHCP lease expires, when the client joins a new network, etc.

FIG. 1 illustrates an example of a client as it initializes and configures an instance of an application in a network in six stages 101-106. In this example, a client 110 communicates with several configuration servers 115. The configuration servers 115 may include traditional DHCP servers, application configuration servers, and hybrid servers that provide both DHCP and application configuration services. More specific examples and descriptions of the process in a mixed environment are described below in Section III.

The client 110 includes a system configuration 120, a DHCP client 125, and an application agent 130. The client 110 of some embodiments is any of a physical machine, a virtual machine running on a host machine, a container operating on a host machine, etc. The system configuration 120 represents the configuration settings for various elements (e.g., Internet Protocol (IP) address, Media Access Control (MAC) address, etc.) of the client 110. The DHCP client 125 operates within the client 110 to communicate with DHCP servers to request IP addresses with which to configure the system configuration 120. The application agent 130 of some embodiments communicates with an application configuration service that operates on some or all of the configuration servers 115 to configure an instance of an application running on the client 110.

The first stage 101 shows the beginning of a traditional DHCP communication. The DHCP communication begins when a client initializes its settings (e.g., upon bootup, when a client joins a network, a lease on a current IP address for the client expires, etc.). The client 110 broadcasts a discovery packet 150 to the configuration servers 115 to request a new IP address. Each of the configuration servers 115 then reserves an IP address from a pool of IP addresses and responds with an offer packet 150 to offer the reserved IP address to the client 110.

In the second stage 102, the client 110 selects the IP address from one of the received offer packets 150 and broadcasts a request packet 152 to the configuration servers 115. By broadcasting the request packet 152, the client 110 informs the configuration servers 115 of the IP address which the client 110 has accepted. The configuration server 115 that sent the accepted IP address allocates the IP address for the client 110, while the remaining configuration servers 115 release their reserved IP addresses to make them available for subsequent requests. The configuration server 115 that sent the accepted IP address then sends an acknowledgement packet 152 to complete the DHCP transaction.

The third stage 103 shows that the DHCP client 125 then assigns the accepted IP address (i.e., 192.168.1.1) to the client 110 as shown in the system configuration 120. The third stage 103 further shows that an instance 135 of an application has been instantiated on the client 110. The application instance 135 of some embodiments is a big data application (e.g., Hadoop, OpenStack, etc.) that operates in parallel with many other instances of the application on many other machines in the network. The various instances of the application operate individually, but often must share and distribute certain resources and configuration information in order to work together.

In the fourth stage 104, the application agent 130 receives an application ID from the application. In some embodiments, the application agent 130 detects the instantiation of the application instance 135 and identifies an application ID associated with the particular application. In some embodiments the application agent is specific to each application and uses a static application ID for the application. The application agent of some embodiments maintains a listing of the available applications and corresponding application IDs for each, identifying the appropriate application ID when a new application is instantiated.

The fourth stage 104 shows that the application agent 130 then communicates with the configuration servers 115, similar to the DHCP communications in the first stage 101. However, the fourth stage 104 shows that the DHCP-formatted discovery and offer packets 156 communicated between the client 110 and configuration servers 115 also include the application ID specific to the newly instantiated application instance 135. In some embodiments, the application ID is stored in unused fields of the DHCP-formatted packets.

The application agent 130 broadcasts discovery packets 156 that include the application ID to the configuration servers 115. The configuration servers 115 reserve a set of configuration resources and respond with offer packets 156 that include the application ID from the configuration servers 115 and the reserved set of configuration resources. In some embodiments, the reserved configuration resources are IP addresses that are reserved for the particular application or other configuration settings that need to be shared, or pooled, between the various instances of the application.

In the fifth stage 105, the client 110 selects the configuration resources from one of the received offer packets 156 and broadcasts a request packet 158 that includes the application ID to the configuration servers 115. The configuration server 115 that sent the accepted configuration resources allocates the configuration resource for the instance 135 of the application running on the client 110, while the remaining configuration servers 115 release the reserved configuration resources to make them available for subsequent requests. The configuration server 115 that sent the accepted configuration resources then sends an acknowledgement packet 158 to complete the application configuration transaction.

Finally, the sixth stage 106 shows application agent 130 updates the system configuration 120 with a new IP address (i.e., 192.168.2.1). In this example, the configuration resources are IP addresses in a different subnet from the originally assigned IP address (i.e., 192.168.1.1).

The configuration resources in some embodiments include other configuration information that is stored in either a single field or in multiple unused fields of the DHCP-formatted packets. For example, the configuration resources of some embodiments include central server IP addresses, Application Programming Interface (API) version numbers, a root Uniform Resource Locator (URL)/directory of a public service, a key (e.g., an encrypted string) used to join a particular network, etc.

The application agent 130 of some embodiments is configured to use various different types of configuration resources to reconfigure the client (e.g., OS network configurations) or the application (e.g., application settings). The application agent 130 of some embodiments is configured to identify the particular application associated with the configuration resources and to make specific changes to an application's configuration file.

Figure 2:
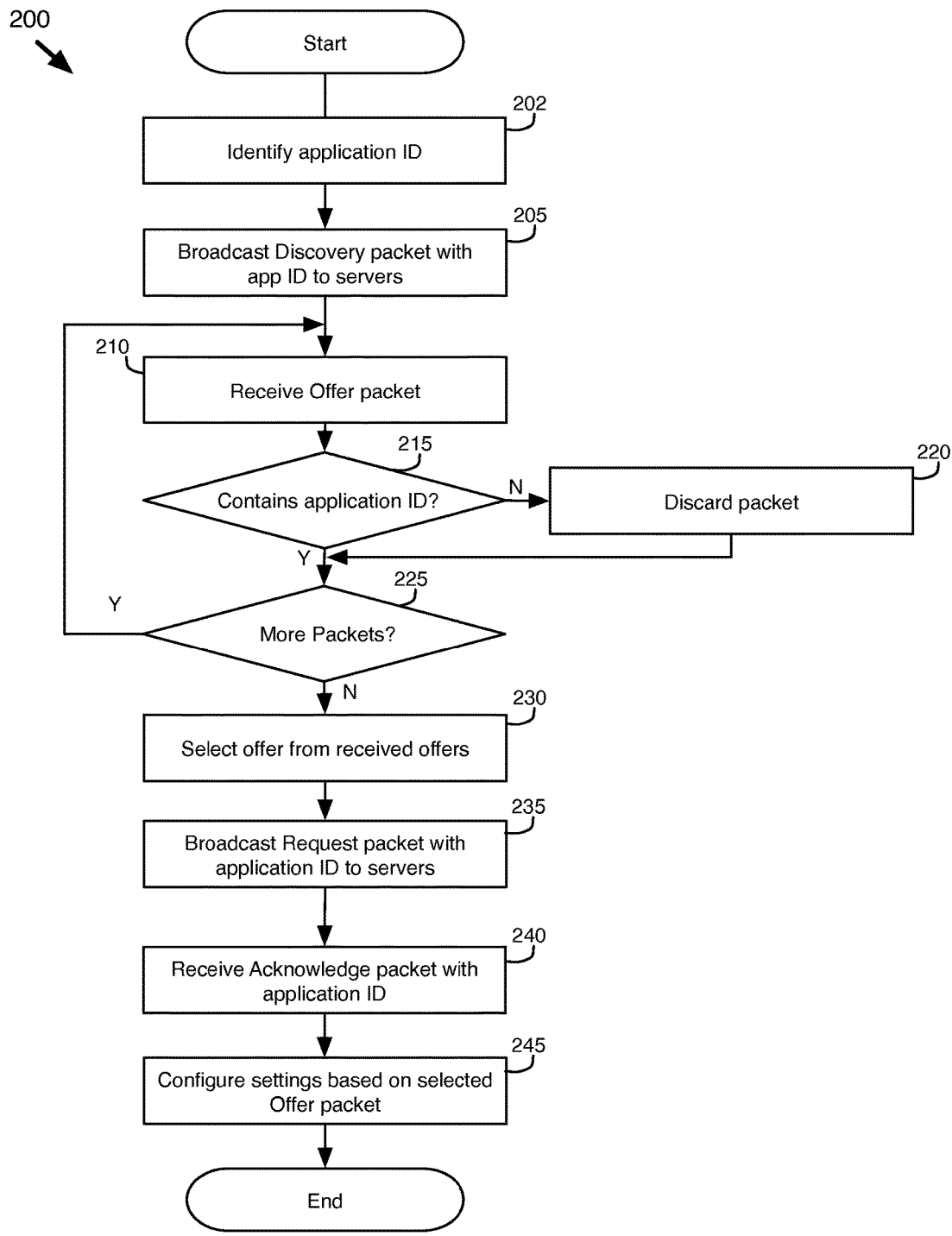
FIG. 2 conceptually illustrates a process for configuring an instance of an application in a network.

FIG. 2 conceptually illustrates a process for configuring an instance of an application in a network. The process 200 of some embodiments is performed by an application agent operating on a client as described above with reference to FIG. 1. The process 200 identifies (at 202) an application ID for an application operating on the client. The application ID is a unique ID (e.g., a UUID) for each application and will be the same for each instance of the application operating in the network. In some embodiments, rather than a single application ID for each application, an application may have multiple IDs for different roles within the application. For example, a first group of instances of an application may serve in a first role and use a first application ID while a second group of instances of the same application may serve a second, different role and use a second application ID.

The process 200 then broadcasts (at 205) a discovery packet with the application ID to configuration servers. In some embodiments, the discovery packet is formatted according to the Dynamic Host Configuration Protocol (DHCP). In some such embodiments, the application ID is stored in one or more fields of the DHCP-formatted discovery packet that are unused according to the protocol. For example, the sname (64 bytes) and file (128 bytes) fields of the discovery packet are not used for DHCP.

In response to the broadcasted discovery packet, the process 200 receives (at 210) an offer packet. In some embodiments, the offer packets are received from application configuration servers, DHCP servers (i.e., servers that provide dynamic IP services), and hybrid servers (i.e., servers with both application configuration services as well as dynamic IP services).

As the packets that the application configuration uses are DHCP-formatted packets, the DHCP servers of some embodiments are unable to distinguish between packets from a DHCP client and an application configuration agent. In such cases, the DHCP server still sends DCHP responses to application configuration requests. Therefore, the process 200 of some embodiments analyzes the DHCP-formatted packets to determine (at 215) whether the received offer packet contains the application ID. When the offer packet does not contain the application ID (e.g., when the offer packet is received from a DHCP server), the process discards (at 220) the offer packet and continues to step 225.

As the received offer packets are processed, the process 200 determines (at 225) whether there are more packets to receive. The process 200 of some embodiments waits to receive a packet from each configuration server in the network. In some embodiments, the process 200 determines (at 225) that there may be more packets as long as a set timeout period has not expired. When the process determines (at 225) that more packets are to be received, the process returns to step 210.

Once the process 200 determines (at 225) that no more packets are to be received, the process 200 selects (at 230) an offered resource from one of the received packets. In some embodiments, the process 200 selects (at 230) a resource from the first application configuration packet that is received. The process 200 then broadcasts (at 235) a request packet with the application ID back to the configuration servers to announce the selected resource, and to allow the remaining configuration servers to release any reserved resources.

The process 200 then receives (at 240) an acknowledgement packet containing the application ID from the configuration server that provided the selected resource to confirm the allocation of the resource. The process 200 then configures (at 245) settings based on the selected resource. In different embodiments, the process 200 configures (at 245) settings of the client machine, the application, or both.

II. Application Configuration Service

The application agents on the clients communicate with application configuration services on the configuration servers to request configuration resources. Some embodiments of the invention provide hybrid configuration servers that provide both standard DHCP services and application configuration services. In some embodiments, configuration servers operate on separate machines from the clients. In some embodiments, some of the clients are virtual machines that operate on a hypervisor of a host machine and the configuration servers operate on the same host machine. In some of these embodiments, the configuration servers are distributed configuration servers that provide the standard DHCP services and application configuration services as a part of the hypervisor on each host machine in a network (e.g., as local agents operating in such host machines). The distribution of such services at the host machines is described in further detail in U.S. Patent Publication 2015/0180824, published Jun. 25, 2015, U.S. Patent Publication 2015/0052522, published Feb. 19, 2015, U.S. Patent Publication 2015/0058968, published Feb. 26, 2015, and U.S. Patent Publication 2015/0058463, published Feb. 26, 2015, which are incorporated herein by reference.

Figure 3:
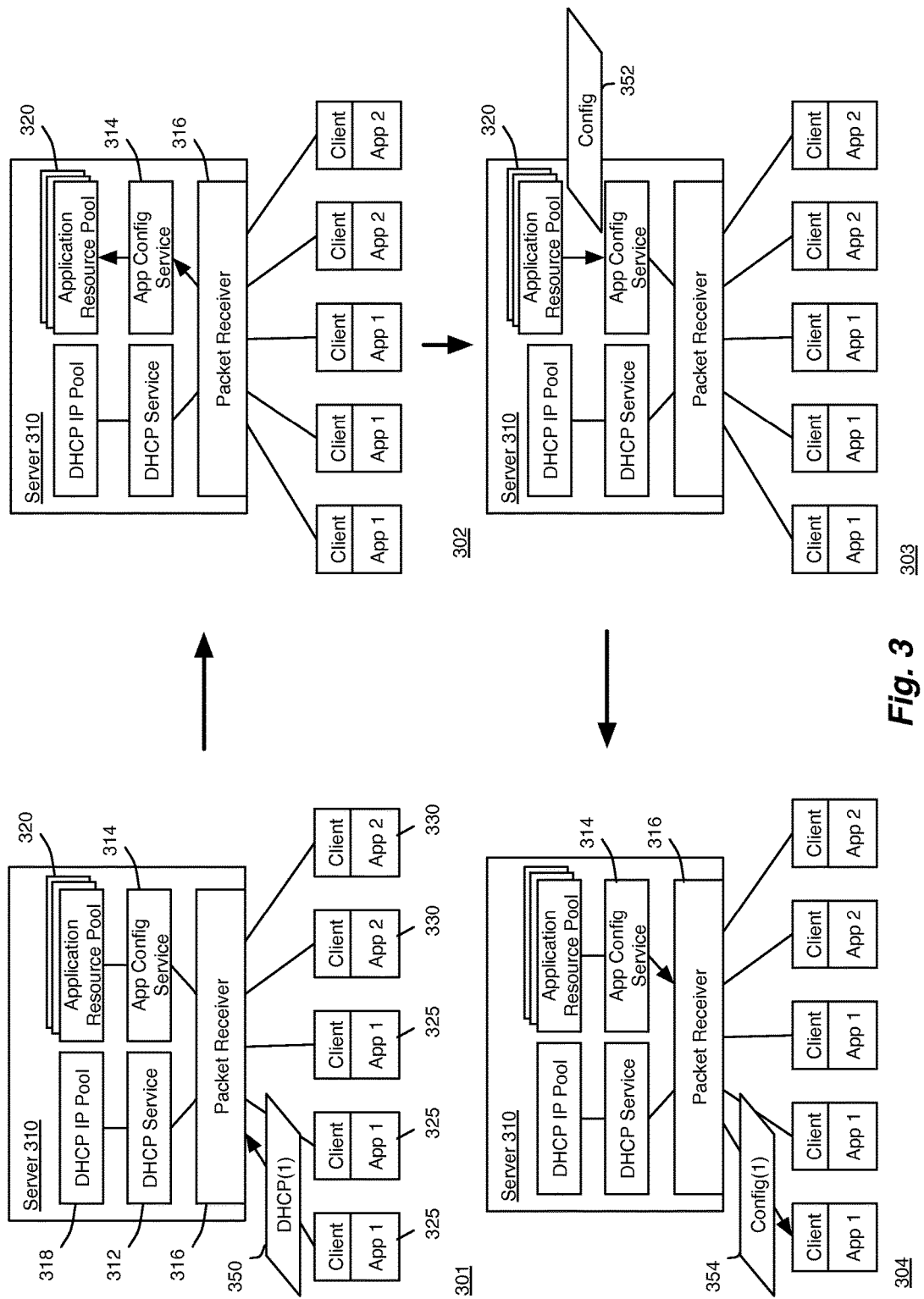
FIG. 3 illustrates an example of a configuration server that provides configuration information for an instance of an application executing on a client.

FIG. 3 illustrates an example of a hybrid configuration server that provides both DHCP and application configuration information for an instance of an application executing on a client in four stages 301-304. This example shows a configuration server 310 that communicates with multiple clients 325-330 running different applications (App 1 and App 2). Although the examples in this description use two applications, it should be understood that the invention may apply to several applications, as well as to multiple roles within an application. In addition, as mentioned, though the DHCP service is shown here as operating on a server, it should be understood that this functionality could be implemented in a distributed manner across the host devices on which the clients operate. The configuration server 310 includes a packet receiver 316, a DHCP service 312, an application configuration service 314, a DHCP IP pool 318, and a set of application resource pools 320.

In the first stage 301, one of the App 1 clients 325 sends a DHCP-formatted packet 350 to configuration server 310. The packet receiver 316 receives the DHCP-formatted packet 350, which includes an application ID (i.e., 1) that indicates that the request is coming from an instance of App 1.

The packet receiver 316 of some embodiments receives packets and distributes the packets between the DHCP service and the application configuration service based on whether the packet contains an application ID. As described above, in some embodiments, the application ID is embedded in unused fields of a DHCP-formatted packet.

In the second stage 302, the packet receiver 316 receives the packet and determines that the packet contains an application ID. If the DHCP-formatted packet 350 did not have the application ID, the packet receiver 316 would send the packet to the DHCP service 312.

Once the packet receiver 316 determines that the packet contains an application ID for a particular application, the packet receiver 316 needs to determine whether the configuration server 310 has a resource pool for the particular application. The packet receiver 316 of some embodiments determines whether the configuration server 310 maintains a resource pool for the particular application by storing a list of application IDs (not shown) for which the configuration server 310 maintains an application resource pool 320.

The packet receiver 316 of some such embodiments discards packets that have application IDs for which the configuration server 310 does not maintain an application resource pool 320. Alternatively, in some embodiments, the packet receiver 316 is unable to distinguish a packet with an unknown application ID from a packet with no application ID, and sends any packet that does not have a known application ID to the DHCP service 312. In some embodiments, the hybrid configuration servers do not use a packet receiver, and each DHCP-formatted packet is sent to both the DHCP service and the application configuration service.

The third stage 303 shows that the application configuration service 314 retrieves a configuration resource 352 from the application resource pools 320. The application resource pools 320 may provide one or more different types of resources (e.g., an Internet Protocol (IP) address, a Media Access Control (MAC) address, etc.) that may be stored in the various unused fields of a DCHP-formatted packet.

The application configuration service 314 reserves the configuration resource and sends a configuration packet 354 back to the requesting client 325, as shown in the fourth stage 304. The configuration packet 354 contains the application ID and the reserved configuration resource. The application ID allows the client 325 to identify the packet 354 as a configuration packet. In some embodiments, the configuration resource, like the application ID, is stored in other unused fields of the DHCP packet. The application configuration service of some embodiments embeds multiple configuration variables in different fields of the configuration packet 354 to configure the application and/or client.

Figure 4:
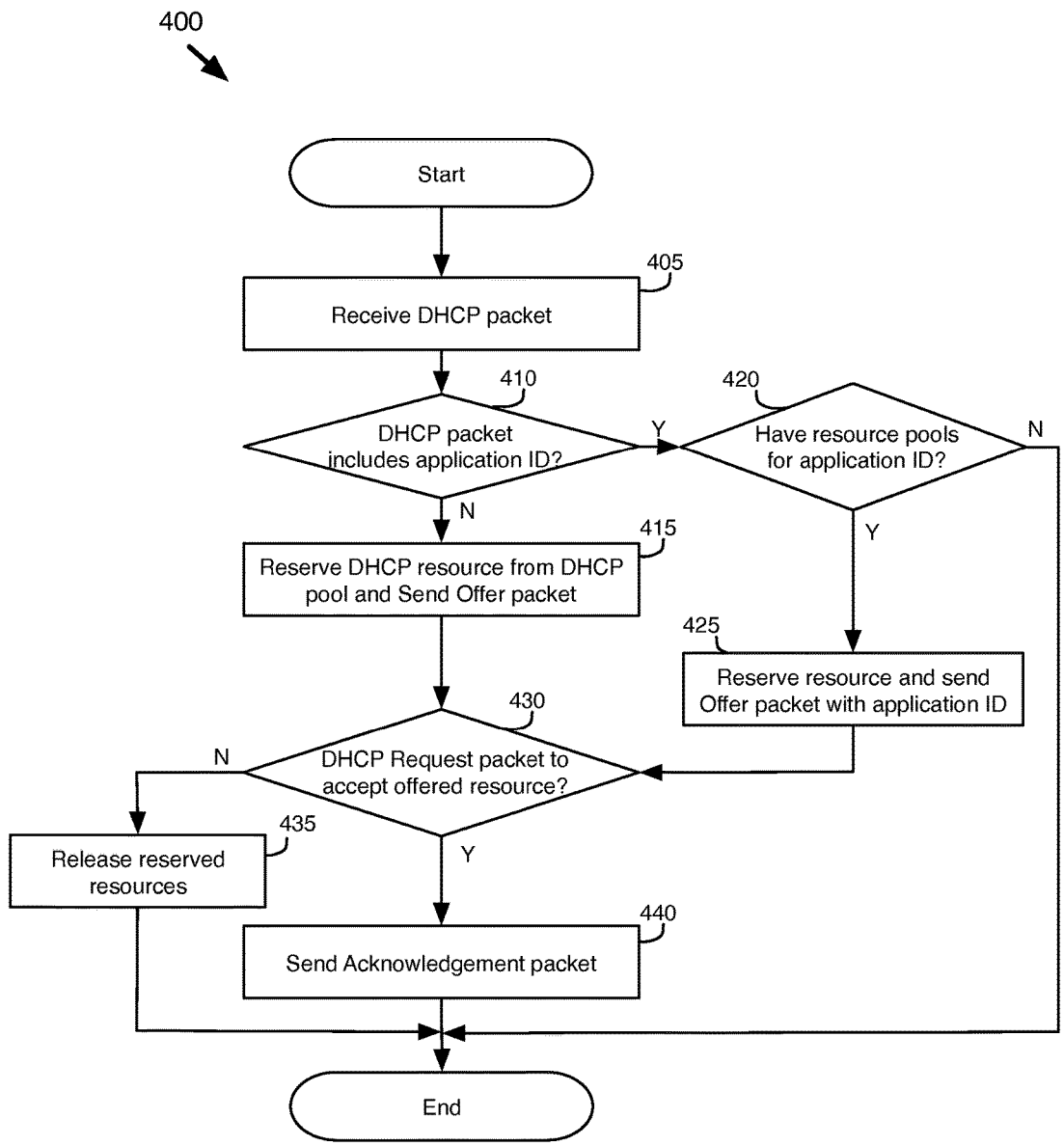
FIG. 4 conceptually illustrates a process for processing DHCP-formatted packets at a configuration server.

FIG. 4 conceptually illustrates a process for processing DHCP-formatted packets at a configuration server or a local DHCP agent. The process 400 of some embodiments is performed by a packet receiver on a configuration server. The process 400 receives (at 405) a DHCP-formatted packet from a source client. The process 400 then determines (at 410) whether the DHCP-formatted packet includes an application ID. In some embodiments, the process 400 determines whether the DHCP-formatted packet includes an application ID by analyzing fields of the packet and comparing the contents to known application IDs (e.g., application IDs stored in a list or database).

When the process 400 determines (at 410) that the packet does not include an application ID (i.e., the packet is a normal DHCP packet), the process 400 reserves an IP address from the DHCP IP pool. The process 400 then sends an offer packet with the reserved IP address back to the source client.

When the process 400 determines (at 410) that the packet does include an application ID, the process determines (at 420) whether the configuration server maintains resource pools for the particular application ID. In some embodiments, each configuration server maintains resource pools for different groups of applications. For example, a first application configuration server may maintain resource pools for applications A, B, and C, while a second application configuration server maintains resource pools for applications C, D, and E.

When the process 400 determines (at 420) that the client does not maintain resource pools for the particular application ID, the process ignores the packet and ends. When the process 400 determines (at 420) that the client does maintain a resource pool for the particular application ID, the process 400 reserves (at 425) a resource from the corresponding resource pool and sends an offer packet with the application ID and the reserved resource back to the source client.

In response to the offer packet (with or without an application ID), the process 400 receives a request packet and determines (at 430) whether the request packet accepts the offered resource (i.e., the DHCP IP address or the application configuration resource). When the process 400 determines (at 430) that the reserved resources were not accepted, the process releases (at 435) the reserved resources back to the respective resource pool. When the process 400 determines (at 430) that the reserved resource was accepted, the process sends (at 440) an acknowledgment packet back to the source client to confirm the completion of the transaction.

III. Application Configuration in a Mixed Environment

The application agent and the application configuration service of some embodiments work in a mixed environment of dedicated and hybrid configuration servers. The mixed environment allows for more flexible deployment of configuration servers in the network.

Figure 5:
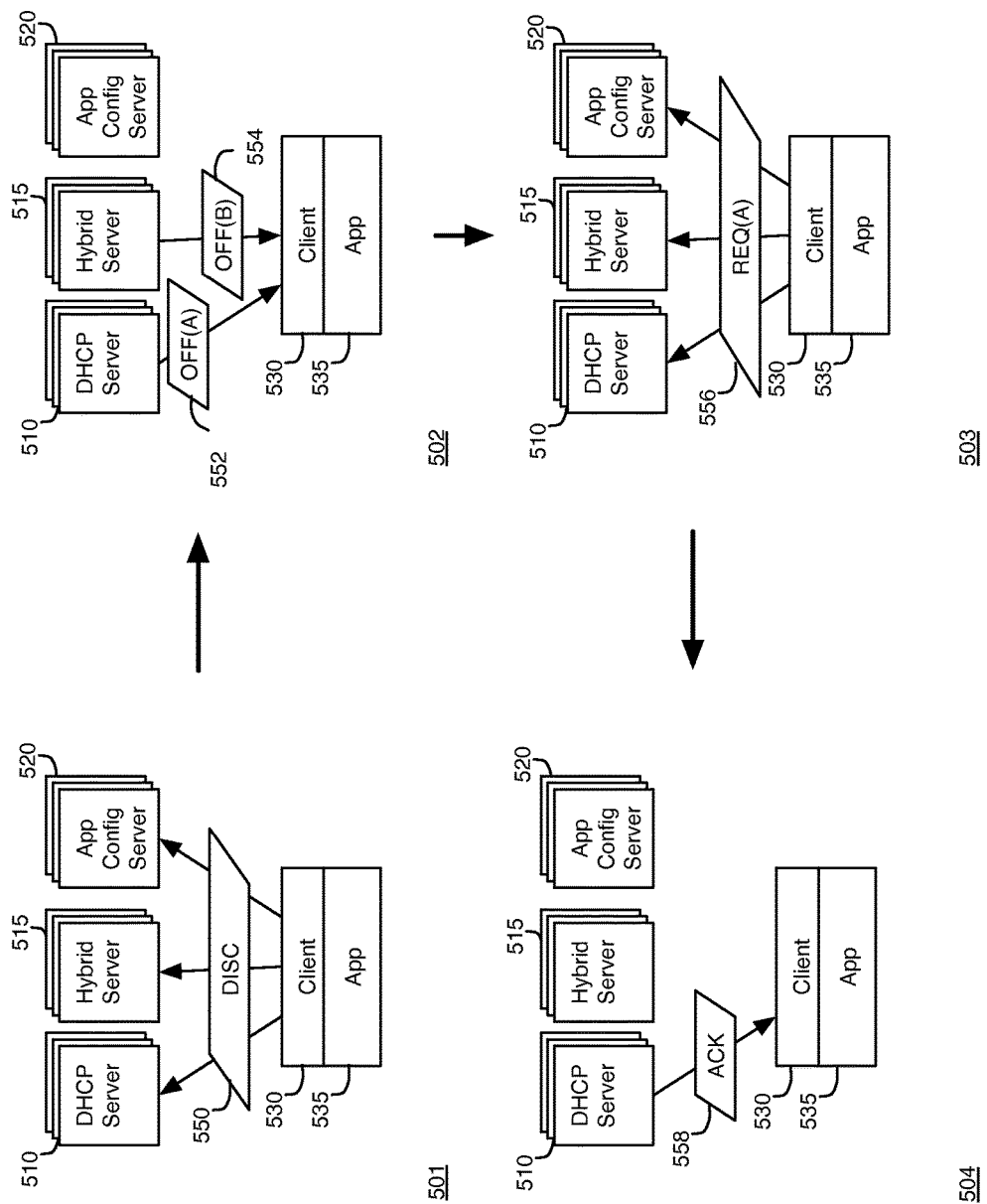
FIG. 5 illustrates an example of configuring a client with a dynamic IP address in a mixed configuration server environment.
Figure 6:
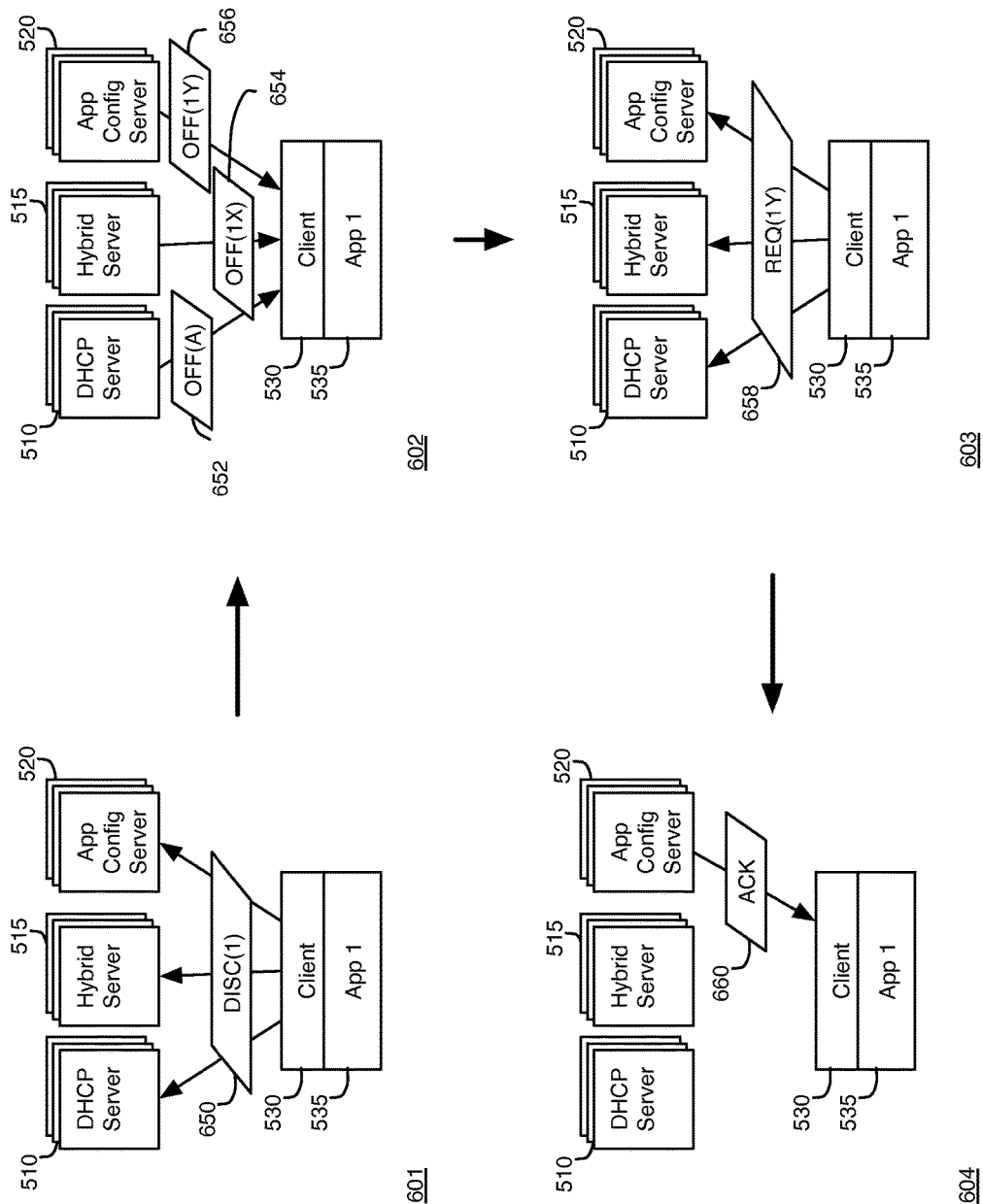
FIG. 6 illustrates an example of configuring an instance of an application running on a client in a mixed configuration server environment.

FIGS. 5 and 6 illustrate more detailed examples of DHCP and application configuration in a mixed network environment. FIG. 5 illustrates an example of configuring a client with a dynamic IP address in a mixed configuration server environment in four stages 501-504. In this example, client 530 communicates with various configuration servers 510-520 in a network. The configuration servers 510-520 include DHCP servers 510, application configuration servers 520, and hybrid servers 515.

The first stage 501 shows that client 530 broadcasts a DHCP discovery packet 550 to all of the configuration servers 510-520. The client 530 broadcasts the packet to request an IP address.

In the second stage 502, the DHCP server 510, hybrid server 515, and application configuration server 520 receive the discovery packet 550. DHCP server 510 reserves an IP address A, and responds with an offer packet 552, offering IP address A. The hybrid server 515 of some embodiments determines that the discovery packet 550 does not have an application ID, and so reserves an IP address B and responds to the discovery packet 550 with an offer packet 554, offering address B. The dedicated application configuration server 520 determines that the broadcasted discovery packet 550 does not include an application ID and does not send any offer packets back to the client 530.

In the third stage 503, the client 530 broadcasts a request packet 556 that accepts the address A offered by the DHCP server 510. The hybrid server 515 receives the request packet 556 and releases address B back into the IP pool of the hybrid configuration server 515. DHCP server 510 allocates IP address A to client 530 and, in the fourth stage 504, sends an acknowledgement packet 558 back to the client 530 to finalize the communication.

FIG. 6 illustrates an example of configuring an instance of an application running on a client in a mixed configuration server environment in four stages 601-604. In this example, client 530 again communicates with various configuration servers 510-520 in the network, but in this case, the client requests application configuration settings for an application, App 1, operating on the client 530.

The first stage 601 shows that client 530 broadcasts a discovery packet 650 to all of the configuration servers 510-520. Unlike the DHCP discovery packet 550 of FIG. 5, the discovery packet 650 includes the application ID (i.e., 1) associated with App 1. The client 530 broadcasts the packet 650 to the configuration servers 510-520 to request resources (or configuration data) for the application App 1.

In the second stage 602, the DHCP servers 510, hybrid servers 515, and application configuration server 520 receive the discovery packet 650. As the DHCP servers of some embodiments are unable to distinguish an application configuration request from a DHCP request, the DHCP server 510 reserves an IP address A, and responds with an offer packet 652, offering IP address A. The hybrid server 515 of some embodiments determines that the discovery packet 650 has an application ID, and so reserves a resource X from a pool of resources for App 1 and responds to the discovery packet 650 with an offer packet 654 with the application ID, offering resource X. Similarly, the dedicated application configuration server 520 determines that the broadcasted discovery packet 650 includes an application ID and sends an offer packet 656 with the application ID back to the client 530, offering resource Y.

In the third stage 603, the client 530 broadcasts a request packet 658 that accepts the resource Y offered by the application configuration server 520. The DHCP server 510 receives the request packet 658 and releases address A back to the IP pool of the DHCP server, while the hybrid server 515 receives the request packet 658 and releases resource X back into the resource pool for App 1 on the hybrid server. Application configuration server 620 allocates resource Y to the instance of App 1 operating on client 530 and, in the fourth stage 604, sends an acknowledgement packet 660 back to the client 530 to finalize the communication.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
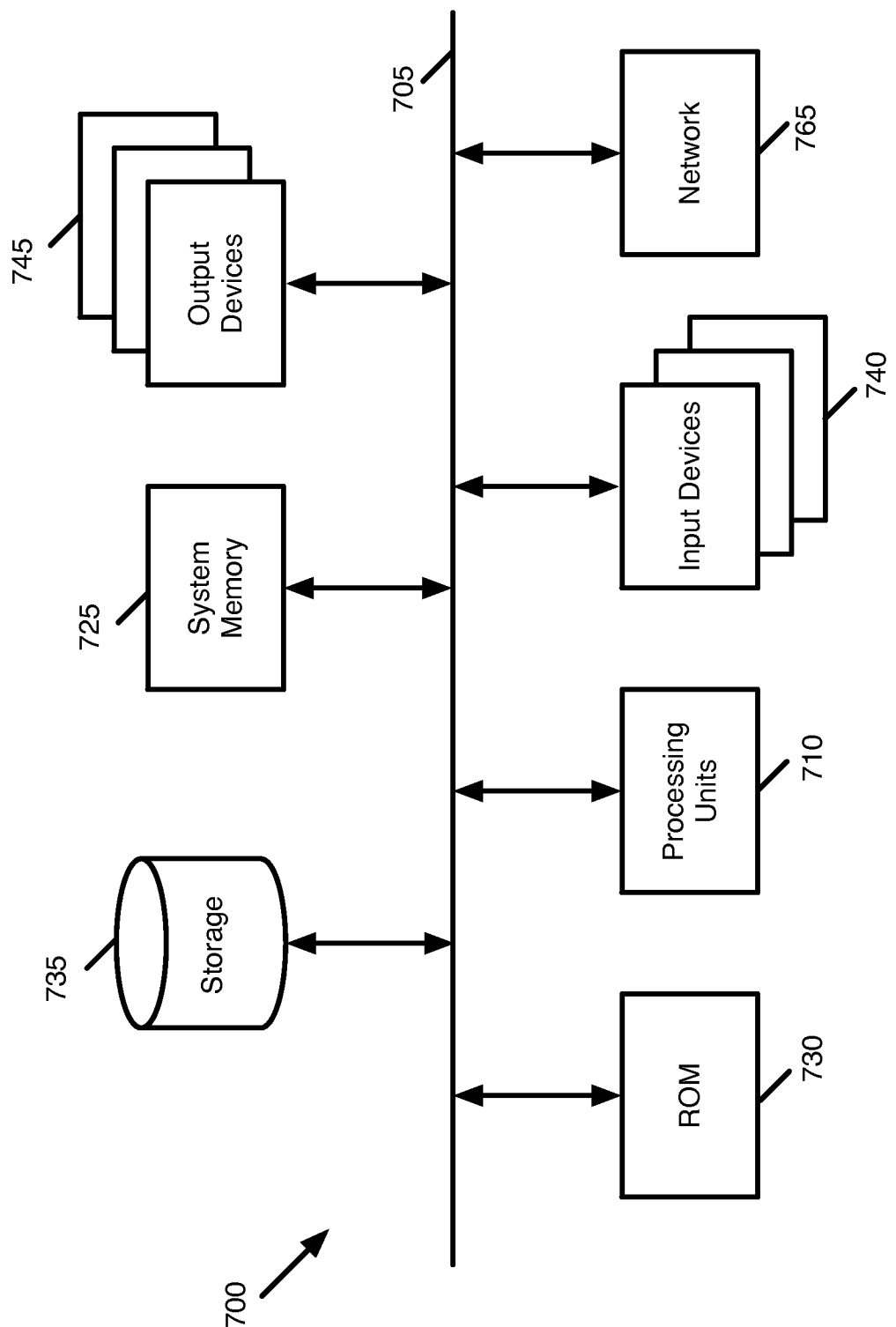
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory machine readable medium storing a program which when executed by a set of processing units of a host computer dynamically re-configures a client machine that (i) is executed by the set of processing units, (ii) is assigned a first Internet Protocol (IP) address, and (iii) runs an application, the program comprising sets of instructions for:
   identifying an application identifier (ID) that identifies the application;
   transmitting a Dynamic Host Configuration Protocol (DHCP) discovery packet comprising the application ID;
   receiving a set of response packets from a set of DHCP configuration servers, the response packets comprising IP addresses designated for the application based on the application identifier, said designated IP addresses comprising a second IP address; and
   based on a particular response packet of the received set of response packets, dynamically re-configuring the client machine by assigning the second IP address to the client machine in order to replace the first assigned IP address.

2. The non-transitory machine readable medium of claim 1, wherein the set of response packets are formatted according to the DHCP protocol.

3. The non-transitory machine readable medium of claim 1, wherein the application ID is stored in a field of the discovery packet that is unused by DHCP.

4. The non-transitory machine readable medium of claim 1, wherein the set of instructions for receiving the set of response packets comprises sets of instructions for:
   determining whether a particular response packet comprises the application ID; and
   discarding the particular response packet when the particular response packet does not comprise the application ID.

5. The non-transitory machine readable medium of claim 1, wherein the program further comprises a set of instructions for configuring the application running on the client machine by (i) identifying a configuration variable in the particular response packet, and (ii) modifying a configuration setting of the application based on the identified configuration variable.

6. The non-transitory machine readable medium of claim 1, wherein the program further comprises a set of instructions for transmitting a set of request packets comprising the second IP address and the application ID to the set of DHCP configuration servers.

7. The non-transitory machine readable medium of claim 1, wherein the client machine executed by the set of processing units of the host computer is one of a virtual machine and a container.

8. The non-transitory machine readable medium of claim 1, wherein the set of DHCP configuration servers select the IP addresses designated for the application from a pool of shared IP addresses for the application.

9. The non-transitory machine readable medium of claim 1, wherein the set of DHCP configuration servers comprises a first subset of servers that perform standard DHCP services to provide public IP addresses and a second subset of servers that perform application configuration DHCP services to provide application-specific IP addresses.

10. The non-transitory machine readable medium of claim 9, wherein the application-specific IP addresses are a set of private IP addresses reserved for a plurality of client machines that execute on a plurality of host computers and run the application.

11. The non-transitory machine readable medium of claim 9, wherein a particular DHCP service and a particular application configuration service operate on a single DHCP configuration server.

12. The non-transitory machine readable medium of claim 9, wherein the set of instructions for receiving the set of response packets comprises a set of instructions for discarding response packets received from the first subset of servers that perform standard DHCP services.

13. A non-transitory computer readable medium storing a program which when executed by a set of processing units dynamically provides Internet Protocol (IP) addresses for a plurality of client machines that (i) execute on a plurality of host computers and (ii) run a plurality of applications, the program comprising sets of instructions for:
   receiving a Dynamic Host Configuration Protocol (DHCP) discovery packet from a particular client machine that is assigned a first IP address;
   determining whether the discovery packet comprises an application ID for a particular application running on the particular client machine;
   when the discovery packet does not include an application ID for the particular application, sending a first offer packet comprising a first IP address from a first pool of IP addresses to the particular client machine for configuring the particular client machine; and
   when the discovery packet comprises an application ID for the particular application, sending to the particular client machine a second offer packet comprising a second IP address from a second pool of IP addresses reserved for the particular application based on the application ID, the second offer packet for dynamically re-configuring the particular client machine by assigning the second IP address to replace the first assigned IP address.

14. The non-transitory machine readable medium of claim 13, wherein the set of instructions for sending the second offer packet comprises a set of instructions for storing the application ID in the second offer packet.

15. The non-transitory machine readable medium of claim 14, wherein the application ID is stored in a field of the discovery packet and in a field of the second offer packet that are unused by DHCP.

16. The non-transitory machine readable medium of claim 14, wherein the offer packets are formatted according to the dynamic host configuration protocol (DHCP).

17. The non-transitory machine readable medium of claim 16, wherein at least a portion of a set of configuration data is stored in a field of the offer packet that is unused by DHCP, and the set of configuration data comprises a configuration variable that is used to modify a configuration setting of the particular application running on the particular client machine, based on the configuration variable.

18. The non-transitory machine readable medium of claim 13, wherein the program further comprises sets of instructions for, when the discovery packet comprises an application ID:
   determining whether the second pool of IP addresses reserved for the particular application is available;
   when the second pool of IP addresses is not available, discarding the discovery packet; and when the second pool of IP addresses is available, reserving the second IP address from the second pool of IP addresses.

19. The non-transitory machine readable medium of claim 18, wherein the program further comprises sets of instructions for:
receiving a request packet from the particular client machine;
determining whether the request packet comprises the second IP address; and
when the request packet does not comprise the second IP address, releasing the second IP address back to the second pool of IP addresses.

20. The non-transitory machine readable medium of claim 13, wherein the particular client machine executes on a particular host computer in the plurality of host computers and is one of a virtual machine and a container.

21. The non-transitory machine readable medium of claim 20, wherein the program executes on the set of processing units of the same particular host computer on which the particular client machine executes.

22. The non-transitory machine readable medium of claim 13, wherein the first pool of addresses is a pool of public IP addresses.

* * * * *